J. H. PILKINGTON.
SPRING SLIDE.
APPLICATION FILED APR. 10, 1914.
1,126,855.
Patented Feb. 2, 1915.
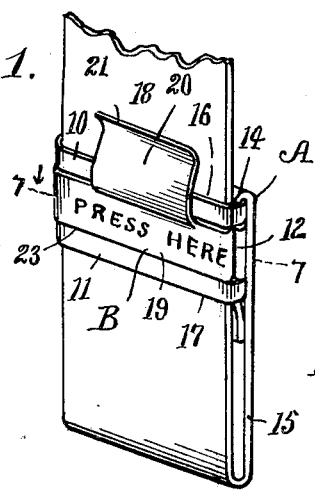
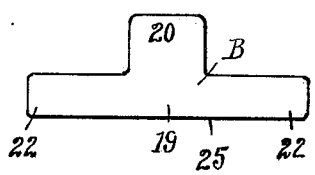
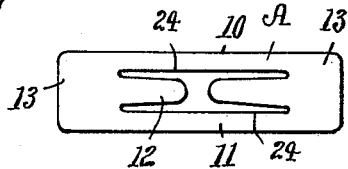
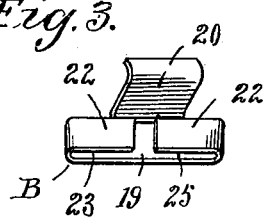
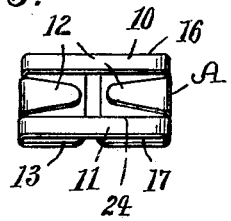
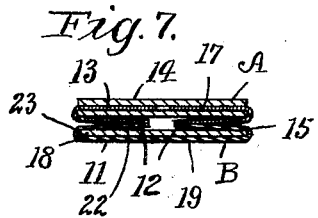
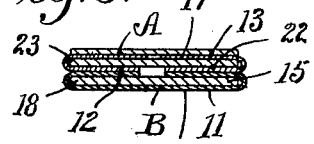
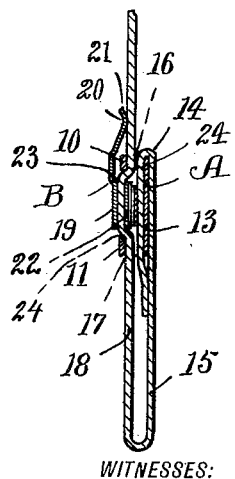
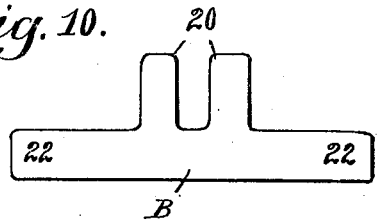
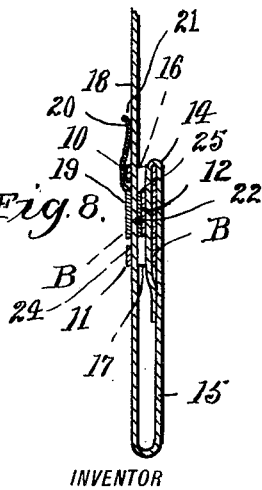
WITNESSES:
Ruth M. Worden
C. Earle Garlick
INVENTOR
Joseph H. Pilkington
BY
Chamberlain & Newman
ATTORNEYS

UNITED STATES PATENT OFFICE.

JOSEPH H. PILKINGTON, OF WATERBURY, CONNECTICUT.

SPRING-SLIDE.

1,126,855.     Specification of Letters Patent.     Patented Feb. 2, 1915.

Application filed April 10, 1914. Serial No. 831,004.

*To all whom it may concern:*

Be it known that I, JOSEPH H. PILKINGTON, citizen of the United States, and resident of Waterbury, in the county of New Haven and State of Connecticut, have invented certain new and useful Improvements in Spring-Slides, of which the following is a specification.

My invention relates to new and useful improvements in spring slides for suspender webbing such as are used for attachment to one end portion of a piece of webbing when employed to form part of a suspender or hose supporter and is used for adjusting the length of the supporter.

The purpose of the invention is to provide an improved form of spring slide which can be made entirely of sheet metal and constructed so as to form a simple and compact structure, without levers or hinged parts; to design it so that it will normally tend to hold the webbing in a clamped or engaged position, but which can be conveniently pressed and operated to free the webbing in a manner to allow it to be slipped backward and forward through the slide, further to form a spring slide to which the webbing may be so attached as to cover the back of the slide and form what is commonly known as a rustless back slide and finally to form a slide which may be constructed of two parts of sheet metal each formed in such a way as to produce a comparatively small amount of scrap and which can be stamped and bent into form by light tools in a simple and inexpensive way.

With the above objects in view the invention further resides and consists in the novel features of construction shown upon the accompanying sheet of drawings forming a part of this specification, upon which similar characters of reference denote like or corresponding parts throughout the several figures and of which—

Figure 1 shows a front perspective view of my improved form of slide as it appears attached to a piece of webbing as in use. Fig. 2 is a plan view of a sheet metal blank from which the front member of the slide is formed. Fig. 3 is a detached rear perspective view of the front or operative member of the slide. Fig. 4 is a plan view of a blank from which the rear or frame member of the slide is formed. Fig. 5 shows a detached front perspective view of the said frame member of the slide. Fig. 6 shows a central vertical sectional view of the slide and attached web as shown in Fig. 1. Fig. 7 shows a horizontal cross section through slide and web as seen on line 7—7 of Fig. 1. Fig. 8 shows a central vertical sectional view of the slide and web and is like Fig. 6, except that the slide is shown compressed and the web in a released position to permit it to be adjusted. Fig. 9 is a horizontal cross section somewhat like Fig. 7 though in a released position to agree with Fig. 8 and Fig. 10 shows a modified form or shape of blank for making the operating member of my slide.

As before stated this slide is formed of two sheet metal parts each of which are designed to be stamped out of sheet metal and then bent to form the particular shapes and constructions required. In Figs. 2 and 4 I have shown one of each of these blanks as they appear after being cut out from the sheet and Figs. 3 and 5 show the same blanks after they have been bent into shape and ready for assembling. The assembling of the two parts of the slide are completed by the connection and threading of the webbing in the manner illustrated in Figs. 1, 6 and 8 as will be later further described.

The part shown in Fig. 5 and which is formed from the blank shown in Fig. 4 is what I have designated as the frame member A, while the part shown in Fig. 3 formed from the blank in Fig. 2 will be designated as the operating member B. The frame member as shown is formed of a single rectangular shaped piece of sheet metal having an H shaped opening in its central portion. This special shaped opening forms upper and lower cross bands 10 and 11 and the inwardly disposed spring tongues 12—12. The end portions 13—13 of the blank are then folded around back and inward so as to aline with each other to form the back to which the end 14 of the webbing 15 is attached. It will thus be seen that when the said frame is bent into the shape described there will be formed an upper and lower loop 16 and 17 respectively, which aline with each other and through which the running portion 18 of the webbing is adjustably threaded. The webbing when strung through these loops of the frame member in this manner passes across and in front of the free end portions of the spring tongues 12 before described, said springs being located in closer to the back 13 than that of the front bands of the loops.

The operating member B of the slide includes a front plate 19 and one or more extended lips 20 which are bowed upward and over the upper band 16 of the frame and has its free end portion or portions 21 disposed against the center portion of the webbing so as to be engaged by the webbing and thus pressed outward away from the frame member. The free end portions 22—22 of the operating piece are folded rearward and inward in alinement with each other to form a loop 23, but which in practice bear against the spring ends 12 of the frame member when the parts are assembled in the manner illustrated. This loop of the operating member thus is arranged between the two loops of the frame member and register therewith so that the running portion of the webbing when threaded through the two parts of the slide will pass through not only the two loops of the back, but also the one loop of the front arranged between the two first mentioned loops. The pair of spring ends on the frame member A tend to force and hold the operating member B outward and thus bind that portion of the webbing which happens to lie in the loop 23 of said member, between the edges 24—24 of the two loops 16 and 17 of the frame and the edges 25 of the single loop 22 of the operating member. This tension or grip may readily be released by pressing a finger or thumb against the front plate of the operating member at the point designated by "Press here" in Fig. 1 which obviously tends to force the spring ends down flat and close thus bringing the loop 23 of the operating member into true alinement with the loops 16 and 17 of the back thereby leaving them free to be slipped backward and forward upon the webbing. The moment the pressure is released from the operating member the springs of the parts promptly tend to press the webbing out again and bind it against the respective edges in the manner previously described. The ends 22 of the part B, forming the loop 23, may be made to form springs or not as preferred. In practice I find that the spring end 12 when properly formed is sufficient to cause the webbing to be grasped in the manner required.

It will be noted from the foregoing that as the running portion of the web is tightened it bears against the end 21 of the lip 20 in a way to force it outward and thus throwing out the upper edge portion 25 of the loop in a way to more firmly bind and hold the webbing, thus insuring a tighter grip of the webbing with any additional tensile strain upon the same.

Having thus described my invention what I claim and desire to secure by Letters Patent is:—

1. A spring slide for suspender webbing comprising two sheet metal members, one a frame-member including a pair of alined loops through which the webbing is adapted to be threaded and a spring intermediate of said loops, and the other an operating member also formed of sheet metal and likewise forming a loop that is situated between the before mentioned loops and adapted to bear against the spring of the frame, the said loop of the operating-member being designed to register with the loops of the frame.

2. A spring slide for suspender webbing of the class described, the same comprising a frame-member and an operating member the former including a pair of loops through which the webbing is adapted to be threaded and a pair of springs intermediate of said loops, the operating-member including a loop that is arranged between the loops of the frame and designed to bear against the springs of the frame, the said loop being normally held out of alinement, but adapted to be pressed so as to register with the loops of the frame in a manner to allow a piece of webbing to be freely drawn therethrough.

3. A spring slide for suspender webbing comprising two sheet metal members, one a frame-member including a back for the attachment of a piece of webbing, a pair of alined loops disposed forward of the back and through which the webbing is adapted to be threaded and a spring intermediate of said loops, and the other an operating-member including a loop in its rear side that is situated between the before mentioned loops and adapted to bear against the spring of the frame, the said loop of the operating-member being designed to register with the loops of the frame.

4. A spring slide for suspender webbing of the class described, the same comprising a frame member and an operating member the former including a pair of loops through which the webbing is adapted to be threaded and a pair of springs intermediate of said loops, the operating-member including a loop that is arranged between the loops of the frame, and designed to bear against the spring-member of the frame, an integral lip extended to engage a web, the said loop being normally held out of alinement, but adapted to be pressed so as to register with the loops of the frame in a manner to allow a piece of webbing to be freely drawn therethrough.

Signed at Waterbury in the county of New Haven and State of Connecticut this eighth day of April A. D., 1914.

JOSEPH H. PILKINGTON.

Witnesses:
CASIMIR H. BRONSON
SAMUEL W. CHAPMAN.